US012724813B2

(12) United States Patent
Dozen et al.

(10) Patent No.: US 12,724,813 B2
(45) Date of Patent: Sep. 1, 2026

(54) SEARCH SYSTEM AND SEARCH METHOD

(71) Applicant: SEMICONDUCTOR ENERGY LABORATORY CO., LTD., Atsugi (JP)

(72) Inventors: Yoshitaka Dozen, Atsugi (JP); Kunitaka Yamamoto, Atsugi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 635 days.

(21) Appl. No.: 17/943,746

(22) Filed: Sep. 13, 2022

(65) Prior Publication Data

US 2023/0078094 A1 Mar. 16, 2023

(30) Foreign Application Priority Data

Sep. 16, 2021 (JP) ................................ 2021-151388

(51) Int. Cl.
*G06F 16/353* (2025.01)
*G06F 16/383* (2019.01)

(52) U.S. Cl.
CPC .......... *G06F 16/353* (2019.01); *G06F 16/383* (2019.01)

(58) Field of Classification Search
CPC ...... G06F 16/344; G06F 16/353; G06F 16/45; G06F 16/483; G06F 16/55; G06F 16/5864; G06F 16/41; G06F 16/383; G06F 16/355
See application file for complete search history.

(56) References Cited

U.S. PATENT DOCUMENTS 5,721,938 A * 2/1998 Stuckey .................. G06F 40/30
704/4
6,317,740 B1 11/2001 Mukherjea et al.
(Continued)

FOREIGN PATENT DOCUMENTS

JP 2000-123047 A 4/2000
JP 2004-157623 A 6/2004
(Continued)

OTHER PUBLICATIONS

Li.L et al., "Associating Figures with Descriptions for Patent Documents", DAS '10: Proceedings of the 9th IAPR International Workshop on Document Analysis Systems, Jun. 9, 2010, pp. 385-392.

*Primary Examiner* — Amanda L Willis
(74) *Attorney, Agent, or Firm* — NIXON PEABODY LLP; Jeffrey L. Costellia

(57) ABSTRACT

A search system capable of searching for an image with a similar represented concept is provided. The search system includes an input unit, a text extraction unit, a tag obtaining unit, and a tag similarity calculation unit. When image data to which an image label is assigned and document data including the image label are supplied to the input unit, the text extraction unit is configured to extract tag-obtaining-purpose text data from the document data on the basis of the image label. The tag obtaining unit is configured to obtain a tag including at least a part of words included in the tag-obtaining-purpose text data. The tag similarity calculation unit is configured to calculate similarity between tags. It is possible to search for an image having a greatly different feature value of the image itself but having a similar represented concept.

20 Claims, 10 Drawing Sheets

(56) References Cited

U.S. PATENT DOCUMENTS

| | | | | |
|---|---|---|---|---|
| 7,231,381 | B2 * | 6/2007 | Li | G06F 16/40 707/999.005 |
| 10,347,293 | B1 * | 7/2019 | Skinner | G06F 3/1462 |
| 2011/0222788 | A1 * | 9/2011 | Tsunokawa | G06F 40/237 382/229 |
| 2019/0005035 | A1 | 1/2019 | Yamazaki et al. | |
| 2020/0409963 | A1 | 12/2020 | Higashi et al. | |
| 2022/0075815 | A1 | 3/2022 | Akimoto et al. | |
| 2022/0156311 | A1 | 5/2022 | Akimoto et al. | |
| 2022/0164381 | A1 | 5/2022 | Akimoto et al. | |
| 2022/0180159 | A1 | 6/2022 | Kimura et al. | |
| 2022/0207070 | A1 | 6/2022 | Higashi et al. | |
| 2022/0245181 | A1 | 8/2022 | Dozen et al. | |
| 2022/0350827 | A1 | 11/2022 | Yamamoto et al. | |

FOREIGN PATENT DOCUMENTS

| | | | |
|---|---|---|---|
| JP | 2017-207947 | A | 11/2017 |
| WO | WO-2020/201866 | | 10/2020 |
| WO | WO-2021/140406 | | 7/2021 |

* cited by examiner

SEARCH SYSTEM AND SEARCH METHOD

BACKGROUND OF THE INVENTION

1. Field of the Invention

One embodiment of the present invention relates to a search system and a search method.

Note that one embodiment of the present invention is not limited to the above technical field. Examples of the technical field of one embodiment of the present invention include a semiconductor device, a display device, a light-emitting device, a power storage device, a memory device, an electronic device, a lighting device, a method for driving any of them, and a method for manufacturing any of them.

2. Description of the Related Art

Prior art search before application for an invention can reveal if there is a relevant intellectual property right. Prior art documents such as domestic or foreign patent documents and papers obtained through the prior art search are helpful in confirming the novelty and non-obviousness of the invention and determining whether to file the application. In addition, prior art document invalidity search can reveal whether there is a possibility of invalidation of the patent right owned by an applicant or whether the patent rights owned by others can be rendered invalidation.

The prior art search can be performed by, for example, retrieval of prior art documents disclosing a drawing similar to a drawing embodying technology before application. Specifically, a user inputs a drawing to a search system, for example, whereby prior art documents including a drawing similar to the input drawing can be searched for.

An image similar to an input image can be searched for using a neural network, for example. Patent Document 1 discloses a method for determining similarity between images using a neural network, for example.

REFERENCE

[Patent Document 1] Japanese Published Patent Application No. 2017-207947

SUMMARY OF THE INVENTION

With calculation of similarity between an input image and a search target image using only image data, an image with a different concept from the input image may be obtained, for example. In that case, an image to be noise is mixed in search results, and an image that is desired to be searched for is not output in some cases. This may decrease the search accuracy of similar images.

Thus, an object of one embodiment of the present invention is to provide a search system capable of searching for an image with a similar represented concept. Another object of one embodiment of the present invention is to provide a search system capable of performing a search easily. Another object of one embodiment of the present invention is to provide a novel search system.

Another object of one embodiment of the present invention is to provide a search method capable of searching for a drawing with a similar represented concept. Another object of one embodiment of the present invention is to provide a search method capable of performing a search easily. Another object of one embodiment of the present invention is to provide a novel search method.

Note that the description of these objects does not preclude the existence of other objects. One embodiment of the present invention does not need to achieve all of these objects. Other objects can be derived from the description of the specification, the drawings, and the claims.

One embodiment of the present invention is a search system including an input unit, a text extraction unit, a tag obtaining unit, and a tag similarity calculation unit. When database image data to which a database image label is assigned and database document data including the database image label are supplied to the input unit, the text extraction unit is configured to extract tag-obtaining-purpose database text data from the database document data on the basis of the database image label. When image data to which an image label is assigned and document data including the image label are supplied to the input unit, the text extraction unit is configured to extract tag-obtaining-purpose text data from the document data on the basis of the image label. The tag obtaining unit is configured to obtain a database tag including at least a part of words included in the tag-obtaining-purpose database text data. The tag obtaining unit is configured to obtain a tag including at least a part of words included in the tag-obtaining-purpose text data. The tag similarity calculation unit is configured to calculate similarity of the database tag with respect to the tag.

In the above embodiment, the text extraction unit may be configured to extract, as first database text, at least a part of paragraphs including the database image label from paragraphs included in the database document data, and use the first database text as the tag-obtaining-purpose database text data; and the text extraction unit may be configured to extract, as first text, at least a part of paragraphs including the image label from paragraphs included in the document data, and use the first text as the tag-obtaining-purpose text data.

In the above embodiment, the text extraction unit may be configured to extract, as the first database text, a paragraph in which the first word is the database image label from the paragraphs included in the database document data; and the text extraction unit may be configured to extract, as the first text, a paragraph in which the first word is the image label from the paragraphs included in the document data.

In the above embodiment, the text extraction unit may be configured to extract, as second database text, at least a part of paragraphs including a word with a reference numeral included in the first database text from the paragraphs included in the database document data, and to make the tag-obtaining-purpose database text data include the second database text; and the text extraction unit may be configured to extract, as second text, at least a part of paragraphs including the word with the reference numeral included in the first text from the paragraphs included in the document data, and to make the tag-obtaining-purpose text data include the second text.

In the above embodiment, the text extraction unit may be configured to extract, as the second database text, a paragraph in which the first word is the word with the reference numeral included in the first database text and which is away from the first database text by a predetermined number of paragraphs or less, from the paragraphs included in the database document data; and the text extraction unit may be configured to extract, as the second text, a paragraph in which the first word is the word with the reference numeral included in the first text and which is away from the first text by a predetermined number of paragraphs or less, from the paragraphs included in the document data.

In the above embodiment, the text extraction unit may be configured to extract, as third database text, a paragraph that is away from a paragraph included in the tag-obtaining-purpose database text data by a predetermined number of paragraphs or less and in which the first word is a conjunctive adverb for adding information, from the paragraphs included in the database document data, and to make the tag-obtaining-purpose database text data include the third database text; and the text extraction unit may be configured to extract, as third text, a paragraph that is away from a paragraph included in the tag-obtaining-purpose text data by a predetermined number of paragraphs or less and in which the first word is a conjunctive adverb for adding information, from the paragraphs included in the document data, and to make the tag-obtaining-purpose text data include the third text.

In the above embodiment, the text extraction unit may be configured to extract the tag-obtaining-purpose text data with a machine learning model on the basis of the image data and the document data; and the machine learning model may be learned using learning image data to which a learning image label is assigned and learning document data including the learning image label.

In the above embodiment, a tag label indicating whether or not text is used for obtaining a tag may be assigned to text represented by the learning document data.

In the above embodiment, the tag label may be assigned on the basis of the learning image label.

In the above embodiment, the tag label may be assigned to each paragraph included in the learning document data.

Another embodiment of the present invention is a search method for searching for a database image to which a database tag including a word is assigned, in which tag-obtaining-purpose text data is extracted from document data on the basis of an image label when an image data to which the image label is assigned and the document data including the image label are input; a tag including at least a part of words included in the tag-obtaining-purpose text data is obtained; and similarity of the database tag with respect to the tag is calculated.

In the above embodiment, at least a part of paragraphs including the image label may be extracted as first text from paragraphs included in the document data, and the first text may be used as the tag-obtaining-purpose text data.

In the above embodiment, a paragraph in which the first word is the image label may be extracted as the first text from the paragraphs included in the document data.

In the above embodiment, at least a part of paragraphs including a word with a reference numeral included in the first text may be extracted as second text from the paragraphs included in the document data, and the second text may be included in the tag-obtaining-purpose text data.

In the above embodiment, a paragraph in which the first word is the word with the reference numeral included in the first text and which is away from the first text by a predetermined number of paragraphs or less may be extracted as the second text from the paragraphs included in the document data.

In the above embodiment, a paragraph that is away from a paragraph included in the tag-obtaining-purpose text data by a predetermined number of paragraphs or less and in which the first word is a conjunctive adverb for adding information may be extracted as third text from the paragraphs included in the document data, and the third text may be included in the tag-obtaining-purpose text data.

In the above embodiment, the tag-obtaining-purpose text data may be extracted with a machine learning model on the basis of the image label and the document data, and the machine learning model may be learned using a learning image label and learning document data including the learning image label.

In the above embodiment, a tag label indicating whether or not text is used for obtaining a tag may be assigned to text represented by the learning document data.

In the above embodiment, the tag label may be assigned on the basis of the learning image label.

In the above embodiment, the tag label may be assigned to each paragraph included in the learning document data.

According to one embodiment of the present invention, a search system capable of searching for an image with a similar represented concept can be provided. According to another embodiment of the present invention, a search system capable of performing a search easily can be provided. According to another embodiment of the present invention, a novel search system can be provided.

According to another embodiment of the present invention, a search method capable of searching for a drawing with a similar represented concept. According to another embodiment of the present invention, a search method capable of performing a search easily can be provided. According to one embodiment of the present invention, a novel search method can be provided.

Note that the description of these effects does not preclude the existence of other effects. One embodiment of the present invention does not necessarily have all of these effects. Other effects can be derived from the description of the specification, the drawings, and the claims.

BRIEF DESCRIPTION OF THE DRAWINGS

FIGS. 4A, 4B1, and 4B2 are schematic views illustrating an example of a method for extracting tag-obtaining-purpose text data.

DETAILED DESCRIPTION OF THE INVENTION

Figure 1:
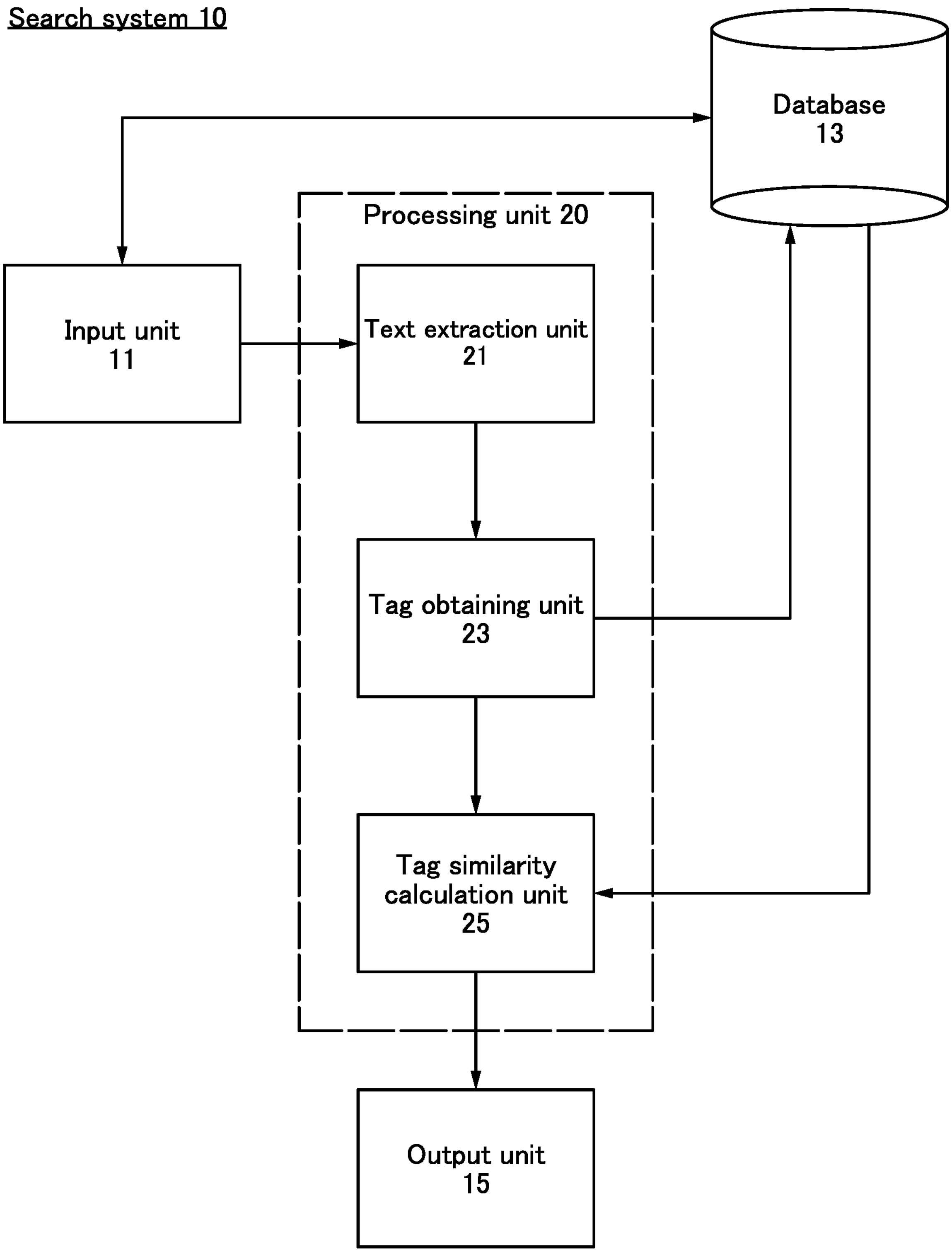
FIG. 1 is a block diagram illustrating a structure example of a search system.

Embodiments will be described in detail with reference to the drawings. Note that the embodiments of the present invention are not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Embodiment 1

In this embodiment, a search system and a search method of embodiments of the present invention will be described with reference to drawings.

One embodiment of the present invention relates to a search system and a search method, in which, when a user inputs literature data including image data and document data, database image data whose feature such as a represented concept, technical contents, or a focal point is similar to that of the image data specified by the user is output. The search system of one embodiment of the present invention uses a database in which a plurality of pieces of literature data (database literature data) including database image data and database document data is registered. Here, an image label (database image label) is assigned to image data (database image data). The image label (database image label) represents a figure number, for example. For example, a database image label assigned to database image data representing an image of FIG. 1 included in a database literature is "FIG. 1".

A database tag is obtained from the database document data on the basis of the database image label, and the database tag is assigned to the database image data and registered in the database. Note that in the search system of one embodiment of the present invention, it is possible to obtain a tag (database tag) without using a feature value of an image itself represented by image data (database image data). The database tag can be a group of nouns obtained by morphological analysis on text obtained from the database document data on the basis of the database image label, for example.

In the search method using the search system of one embodiment of the present invention, when literature data including image data and document data is input to the search system, a tag is obtained by the same method as the method for obtaining a database tag. Next, the similarity of database tags with respect to the obtained tag is calculated. After that, information on database image data to which a database tag having high similarity is assigned is output. Furthermore, information on database literature data including the database image data can be output. Accordingly, the user of the search system of one embodiment of the present invention can search for database image data highly similar to the input image data and database literature data including the database image data.

By the above method, the search system of one embodiment of the present invention can search for, from the database image data, an image having a greatly different feature value of the image itself but having a similar feature such as a similar represented concept, similar contents, or a similar focal point. In addition, by the above method, a tag can be obtained so that the tag can inclusively include words representing the concept, contents, focal point, and the like shown by the image data, as compared with the case where, for example, the user of the search system specifies all the words that are included in a tag assigned to image data and choices of words to be included in the tag are not presented to the user. Thus, the search system of one embodiment of the present invention can perform a search easily.

In this specification and the like, a "word" is a constituent unit of a language that consists of one or more morphemes. Words are grouped by part of speech. Examples of parts of speech include a noun, a verb, an adjective, an adverb, and a conjunction.

In this specification and the like, a user of a device or equipment provided with a system such as a search system is simply referred to as a "user of the system". For example, a user of an information processing device provided with a search system is referred to as a user of the search system.

<Search System_1>

FIG. 1 is a block diagram illustrating a structure example of a search system 10. The search system 10 includes an input unit 11, a database 13, a processing unit 20, and an output unit 15. The processing unit 20 includes a text extraction unit 21, a tag obtaining unit 23, and a tag similarity calculation unit 25.

In FIG. 1, exchange of data or the like between the components of the search system 10 is shown by arrows. Note that the exchange of data or the like shown in FIG. 1 is an example, and data or the like can be sometimes exchanged between components that are not connected by an arrow, for example. Furthermore, data or the like is not exchanged between components that are connected by an arrow in some cases. The same applies to block diagrams other than FIG. 1.

The search system 10 may be provided in an information processing device such as a personal computer (PC). Alternatively, the processing unit 20 and the database 13 of the search system 10 may be provided in a server to be accessed and used by a client PC via a network. Note that the database 13 is not necessarily included in the search system 10. For example, in the case where the input unit 11, the processing unit 20, and the output unit 15 are provided in a client PC and the database 13 is provided in a server, the search system 10 can be regarded as being provided in the client PC.

Although the block diagram shows components classified by their functions in independent blocks, for example, in FIG. 1, it is difficult to classify actual components according to their functions completely and it is possible for one component to have a plurality of functions. Moreover, one function can relate to a plurality of components; for example, a plurality of processes performed in the processing unit 20 may be executed by different servers. Furthermore, some of the plurality of processes performed in the processing unit 20 may be performed in the client PC and the other processes may be performed in the server.

[Input Unit 11]

Data is supplied to the input unit 11 from the outside of the search system 10. The data supplied to the input unit 11 is supplied to the processing unit 20. Alternatively, the data supplied to the input unit 11 is registered in the database 13.

For example, literature data including image data and document data can be input to the input unit 11. The document data includes a text describing the image data. Here, an image label is assigned to the image data. The image label represents, for example, a figure number. For example, an image label assigned to image data representing an image of FIG. 1 included in the literature is "FIG. 1".

Examples of the literature data include a literature relating to a patent application and a literature relating to an application for utility model registration. In these cases, a drawing can be image data and the specification can be document data.

[Database 13]

The database 13 is configured to store data to be a search target. For example, a plurality of pieces of literature data is registered in the database 13. In this specification and the like, "storing data in the database" is referred to as "registering data in the database". For example, "supplying and storing literature data in the database" is referred to as "registering literature data in the database" or registering a literature in the database".

In this specification and the like, literature data registered in the database is referred to as database literature data. Image data, document data, and an image label included in the database literature data are referred to as database image data, database document data, and a database image label, respectively.

Examples of the database literature data include literatures relating to applications. Examples of applications include applications relating to intellectual properties, such as a patent application and an application for utility model registration. There is no limitation on each status of the applications, i.e., whether or not it is published, whether or not it is pending, and whether or not it is registered. Any of a document before application, a document of an application before examination, a document of an application under examination, and a document of a registered application can be registered in the database 13.

The database 13 may include at least one of an application management number for identifying the application (including a number for internal use), an application family management number for identifying the application family, an application number, a publication number, a registration number, a drawing, an abstract, an application date, a priority date, a publication date, a status, a classification (e.g., patent classification or utility model classification), category, a keyword, and the like. These pieces of information may each be used to identify database literature data when the database literature data is supplied to the input unit 11. Alternatively, these pieces of information may each be output to the output unit 15 together with a processing result of the processing unit 20.

Furthermore, various literatures such as a book, a journal, a newspaper, and a paper can be registered in the database 13. Moreover, literatures showing industrial products can be registered in the database 13. For example, a photograph of an industrial product, a drawing illustrating an industrial product, or the like can be image data, and data including a text describing the photograph, the drawing, or the like can be document data. In any of the above cases, at least one of an identification number of each literature, the title, the date of issue or the like, the author name, the publisher name, and the like may be registered in the database 13. When database literature data is supplied to the input unit 11, these pieces of information can each be used to identify the database literature data. Alternatively, these pieces of information can each be output to the output unit 15 together with a processing result of the processing unit 20.

A literature of the same type as the literature that can be used as the database literature data can be literature data to be supplied to the input unit 11. For example, when the database literature data is a literature related to a patent application, the literature data to be supplied to the input unit 11 can be a literature relating to a patent application.

Data obtained when the processing unit 20 performs processing on the database literature data can be registered in the database 13. For example, data obtained when the text extraction unit 21 and the tag obtaining unit 23 of the processing unit 20 perform processing on the database literature data can be registered in the database 13.

[Processing Unit 20]

The processing unit 20 is configured to perform processing such as arithmetic operation with the use of data supplied from the input unit 11, the database 13, or the like. A processing result, i.e., data generated by processing such as arithmetic operation can be supplied to the database 13, the output unit 15, or the like.

The processing unit 20 can include, for example, a central processing unit (CPU). The processing unit 20 may include a microprocessor such as a digital signal processor (DSP) or a graphics processing unit (GPU). The microprocessor may be configured with a programmable logic device (PLD) such as a field programmable gate array (FPGA) or a field programmable analog array (FPAA). The processing unit 20 can interpret and execute instructions from various programs with the use of a processor to process various kinds of data and control programs. The programs that can be executed by the processor may be stored in a memory region included in the processor, for example.

The processing unit 20 may include a main memory. The main memory includes at least one of a volatile memory such as a random access memory (RAM) and a nonvolatile memory such as a read-only memory (ROM).

For example, a DRAM, an SRAM, or the like is used as the RAM, a virtual memory space is assigned in the RAM and utilized as a working space of the processing unit 20.

The ROM can store a basic input/output system (BIOS), firmware, and the like for which rewriting is not needed. Examples of the ROM include a mask ROM, a one-time programmable read only memory (OTPROM), and an erasable programmable read only memory (EPROM). Examples of the EPROM include an ultra-violet erasable programmable read only memory (UV-EPROM) which can erase stored data by irradiation with ultraviolet rays, an electrically erasable programmable read only memory (EEPROM), and a flash memory.

Components included in the processing unit 20 will be described below.

<<Text Extraction Unit 21>>

When literature data including document data and image data to which an image label such as a figure number is assigned is supplied to the processing unit 20, the text extraction unit 21 is configured to extract text from the document data on the basis of the image label, for example. Specifically, the text extraction unit 21 is configured to extract text describing the image data, from the document data.

<<Tag Obtaining Unit 23>>

The tag obtaining unit 23 is configured to obtain a tag including at least a part of words included in the text extracted by the text extraction unit 21. The tag obtaining unit 23 is capable of performing morphological analysis, for example, on the text extracted by the text extraction unit 21 and obtaining a group of nouns included in the morphologically-analyzed text, as a tag. In the morphological analysis, text written in a natural language is divided into morphemes (smallest meaningful units in a language), and parts of speech of the morphemes can be distinguished, for example.

As described above, a tag is obtained on the basis of text extracted by the text extraction unit 21. Therefore, in this specification and the like, text extracted by the text extraction unit 21 is referred to as tag-obtaining-purpose text data. Furthermore, text extracted from the database document data by the text extraction unit 21 is referred to as tag-obtaining-purpose database text data. Moreover, a tag obtained on the basis of tag-obtaining-purpose database text data is referred to as a database tag. The database tag obtained by the tag obtaining unit 23 can be assigned to the database literature data and registered in the database 13.

<<Tag Similarity Calculation Unit 25>>

The tag similarity calculation unit 25 is configured to calculate the similarity of the database tag with respect to the tag obtained from the document data supplied to the input unit 11. The similarity can be calculated using the Jaccard index, the Dice index, or the Simpson index, for example. Alternatively, the similarity can be calculated by using cosine similarity, covariance, unbiased covariance, a Pearson product-moment correlation coefficient, or deviation pattern similarity after words included in the database tag and words included in the tag obtained from the document data supplied to the input unit 11 are each vectorized. Note that, for example, Word2vec, Bag of Words (BoW), or Bidirectional Encoder Representations from Transformers (BERT), which are open-sourced algorithms, can be used for vectorization of words.

[Output Unit 15]

The output unit 15 is configured to supply information to the outside of the search system 10. The information can be a search result. The output unit 15 is configured to supply information on database literature data to the outside of the search system 10, for example, on the basis of the above-described similarity. For example, the output unit 15 is configured to supply information on database literature data to which a database tag having high similarity is assigned, to the outside of the search system 10. The information supplied to the outside of the search system 10 by the output unit 15 can be displayed by a display device provided outside of the search system 10, for example. Thus, the information obtained by the processing unit 20 can be presented to the user of the search system 10.

For example, the search system 10 can present the user of the search system 10 with database image data to which a database tag with the similarity higher than a predetermined value is assigned and database literature data including the database image data. Alternatively, the search system 10 can extract a predetermined number of database tags counted from one with the highest similarity and present the user of the search system 10 with database image data to which the extracted database tags are assigned and database literature data including the database image data. Note that, for example, the display device that presents the user of the search system 10 with information may be included in the search system 10. Information to be supplied to the outside of the search system 10 by the output unit 15 may be selected by the output unit 15 or the processing unit 20. When the processing unit 20 selects the information, for example, the tag similarity calculation unit 25 can conduct the select.

As described above, when literature data including image data and document data is supplied to the input unit 11, the search system 10 extracts text describing the image data from the document data. Then, the search system 10 obtains a group of words included in the extracted text as a tag. After that, the search system 10 calculates similarity between the tag and a database tag obtained by the same method as that for obtaining the tag.

In the above manner, the search system 10 can search for an image having a greatly different feature value of the image itself but having a similar feature such as a similar represented concept, similar contents, or a similar focal point, from the database image data. Furthermore, a literature including the image can be searched for from the database literature data. Accordingly, the search system 10 can search for a patent document, a paper, or an industrial product that is related or similar to an invention before application, for example. Thus, prior art relating to the invention before filing can be searched for. Knowing and reviewing relevant prior art strengthens the invention, leading to a strong patent that other companies are highly likely to infringe.

For example, a patent document, a paper, or an industrial product that is related or similar to an industrial product before sale can be searched for with the use of the search system 10. For example, in the case where the database literature data includes one's own patent documents, the one can confirm whether patent applications are appropriately filed in association with technologies for the one's own industrial product before sale. Alternatively, when the database literature data includes information on intellectual properties of others, the one can confirm whether or not the one's own industrial product before sale infringes the others' intellectual property right. Knowing relevant prior art and reviewing technologies for the one's own industrial product before sale leads to discovery of a novel invention that is to be a strong patent contributing to one's own business. Search for an industrial product after sale may be conducted as well as search for an industrial product before sale.

Furthermore, for example, a patent document, a paper, or an industrial product that is related or similar to a specific patent can be searched for with the use of the search system 10. In particular, a search based on the filing date of the certain patent can reveal easily and accurately whether or not the patent includes grounds for invalidation.

In addition, with the search system 10, a tag can be obtained so that the tag can inclusively include words representing the concept, contents, focal point, and the like shown by the image data, as compared with the case where, for example, the user of the search system specifies all the words that are included in a tag assigned to image data and choices of words to be included in the tag are not presented to the user. Thus, the search system 10 can perform a search easily.

<Search Method>

An example of a search method using the search system 10 will be described below. Specifically, an example of a method for searching for an image whose feature such as a represented concept, technical contents or a focal point is similar to that of image data input to the search system 10, from database image data.

[Obtaining of Database Tag]

Figure 2:
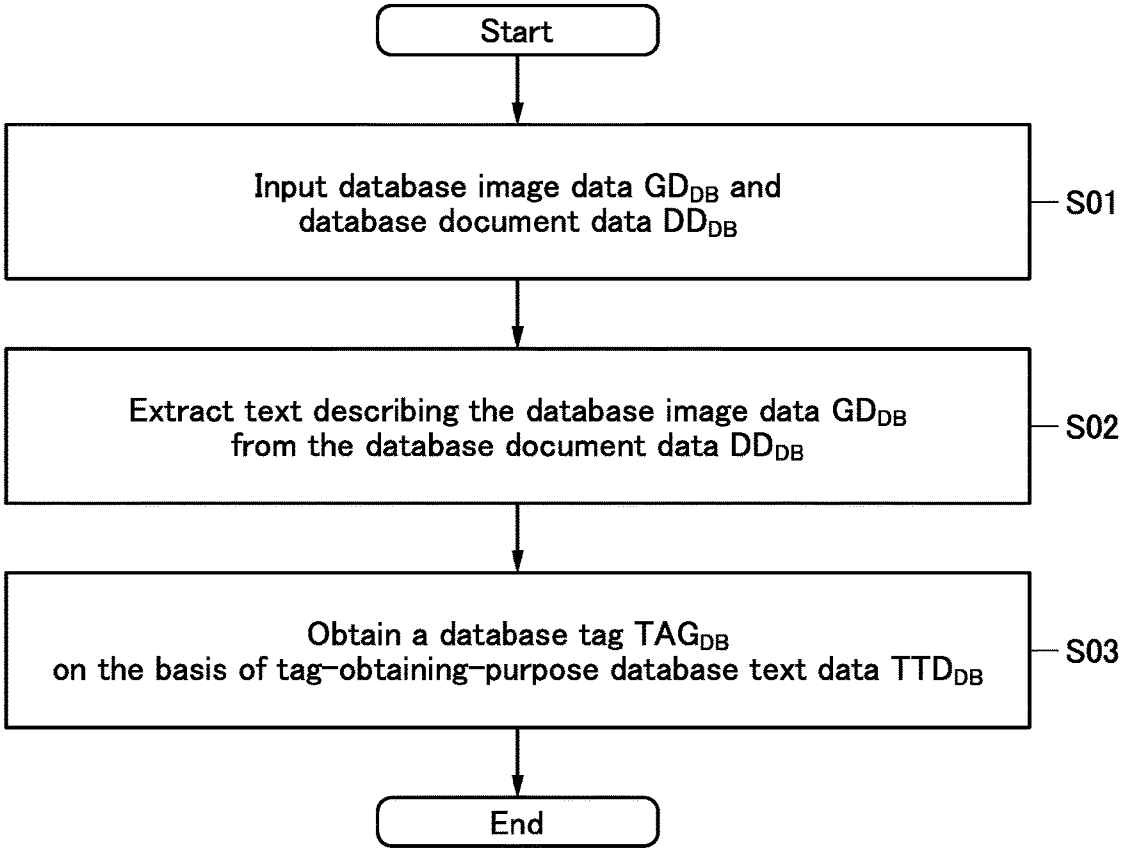
FIG. 2 is a flow chart showing an example of a method for obtaining a database tag.

FIG. 2 is a flow chart showing an example of a method for obtaining a database tag with the use of database literature data. To obtain a database tag, first, database image data $GD_{DB}$ and database document data $DD_{DB}$ are input as shown in Step S01. Specifically, database literature data including the database image data $GD_{DB}$ and the database document data $DD_{DB}$ are supplied to the input unit 11. The database literature data supplied to the input unit 11 is supplied to the text extraction unit 21.

Figure 3:
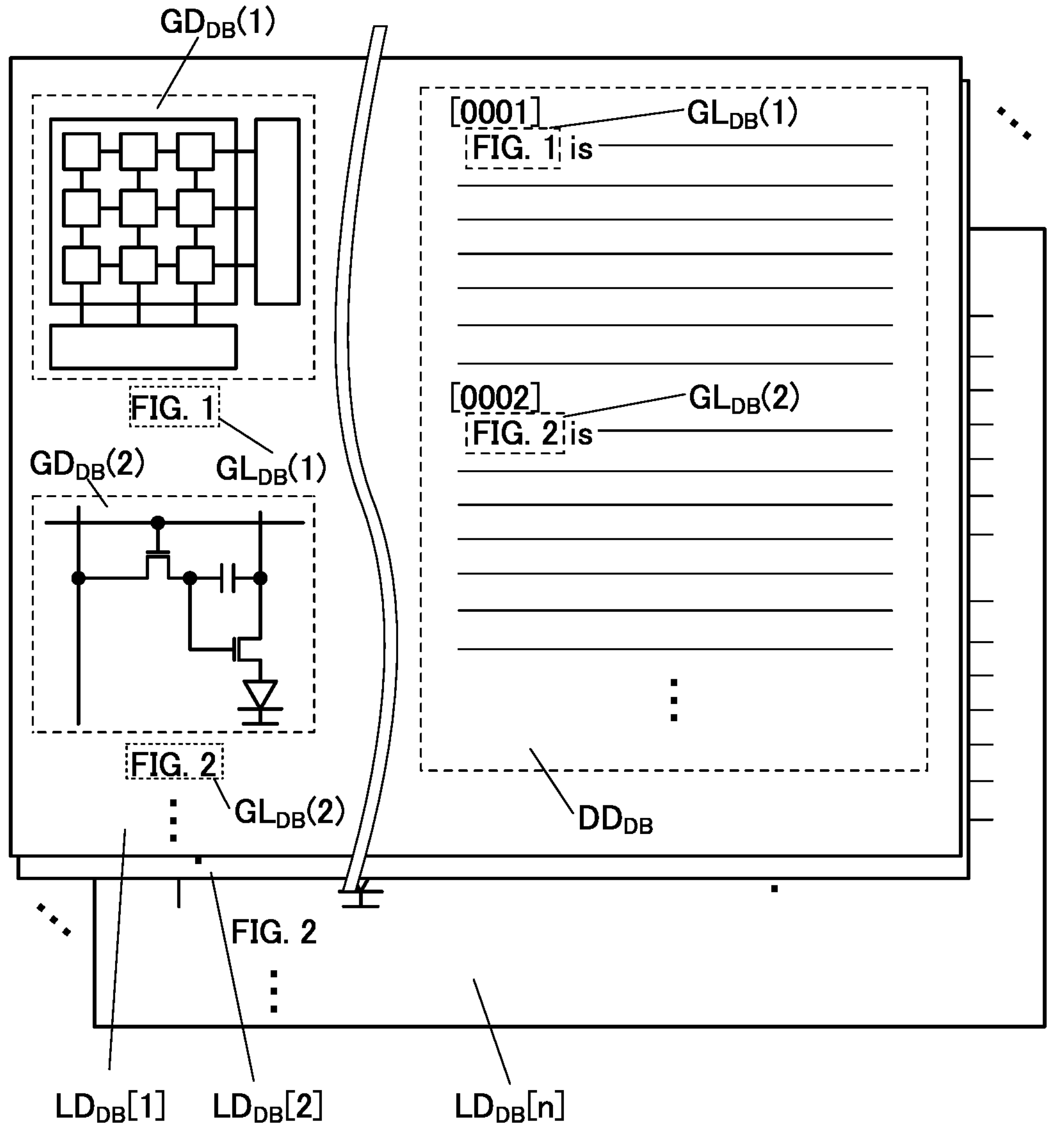
FIG. 3 is a schematic view illustrating an example of literature data.

FIG. 3 is a schematic view illustrating a structure example of database literature data $LD_{DB}$ supplied to the input unit 11 in Step S01. In the example illustrated in FIG. 3, pieces of database literature data $LD_{DB}$[1] to $LD_{DB}$[n] (n is an integer greater than or equal to 1) are supplied to the input unit 11.

In this specification and the like, when a plurality of components denoted by the same reference numerals need to be distinguished from each other, identification signs such as "[ ]" and "( )" are sometimes added to the reference numerals.

The database literature data $LD_{DB}$ includes the database image data $GD_{DB}$ and the database document data $DD_{DB}$. For example, in the case where the database literature data $LD_{DB}$ is a literature relating to a patent application or a literature relating to an application for utility model registration, a drawing can be the database image data $GD_{DB}$ and the specification can be the database document data $DD_{DB}$. A database image label $GL_{DB}$ is assigned to the database image data $GD_{DB}$. As illustrated in FIG. 3, the database image label $GL_{DB}$ can be a figure number, for example. In addition, the database image label $GL_{DB}$ may include an alphabet, a Greek character, a Japanese phonetic alphabet, or another character, for example. Furthermore, the database image label $GL_{DB}$ may include a mark such as ( ). For example, "FIG. 1(*a*)" can be used as the database image label $GL_{DB}$.

In FIG. 3, database image data $GD_{DB}$(1) and database image data $GD_{DB}$(2) are shown as the database image data $GD_{DB}$ included in the database literature data $LD_{DB}$[1]. Then, for example, a database image label $GL_{DB}$(1) is assigned to the database image data $GD_{DB}$(1), and a database image label $GL_{DB}$(2) is assigned to the database image data $GD_{DB}$(2). In other words, a piece of database literature data $LD_{DB}$ can include a plurality of pieces of database image data $GD_{DB}$, and the database image label $GL_{DB}$ can be assigned to each of the plurality of pieces of database image data $GD_{DB}$. For example, in the case where FIG. 1 is divided into FIG. 1(*a*) and FIG. 1(*b*), FIG. 1(*a*) and FIG. 1(*b*) can be different pieces of database image data $GD_{DB}$, and the database image label $GL_{DB}$ can be assigned to each of them. That is, "FIG. 1(*a*)" and "FIG. 1(*b*)" can be different database image labels $GL_{DB}$.

The database document data $DD_{DB}$ includes text describing the database image data $GD_{DB}$. The database document data $DD_{DB}$ includes the database image label $GL_{DB}$. Here, the text included in the database document data $DD_{DB}$ can be divided into a plurality of paragraphs. In the example illustrated in FIG. 3, "FIG. 1" serving as the database image label $GL_{DB}$(1) is included in a paragraph [0001] and "FIG. 2" serving as the database image label $GL_{DB}$(2) is included in a paragraph [0002] in the database document data $DD_{DB}$.

Next, as shown in Step S02 in FIG. 2, the text extraction unit 21 extracts text describing the database image data $GD_{DB}$ from the database document data $DD_{DB}$. The extracted text is referred to as tag-obtaining-purpose database text data $TTD_{DB}$.

Figure 4A:
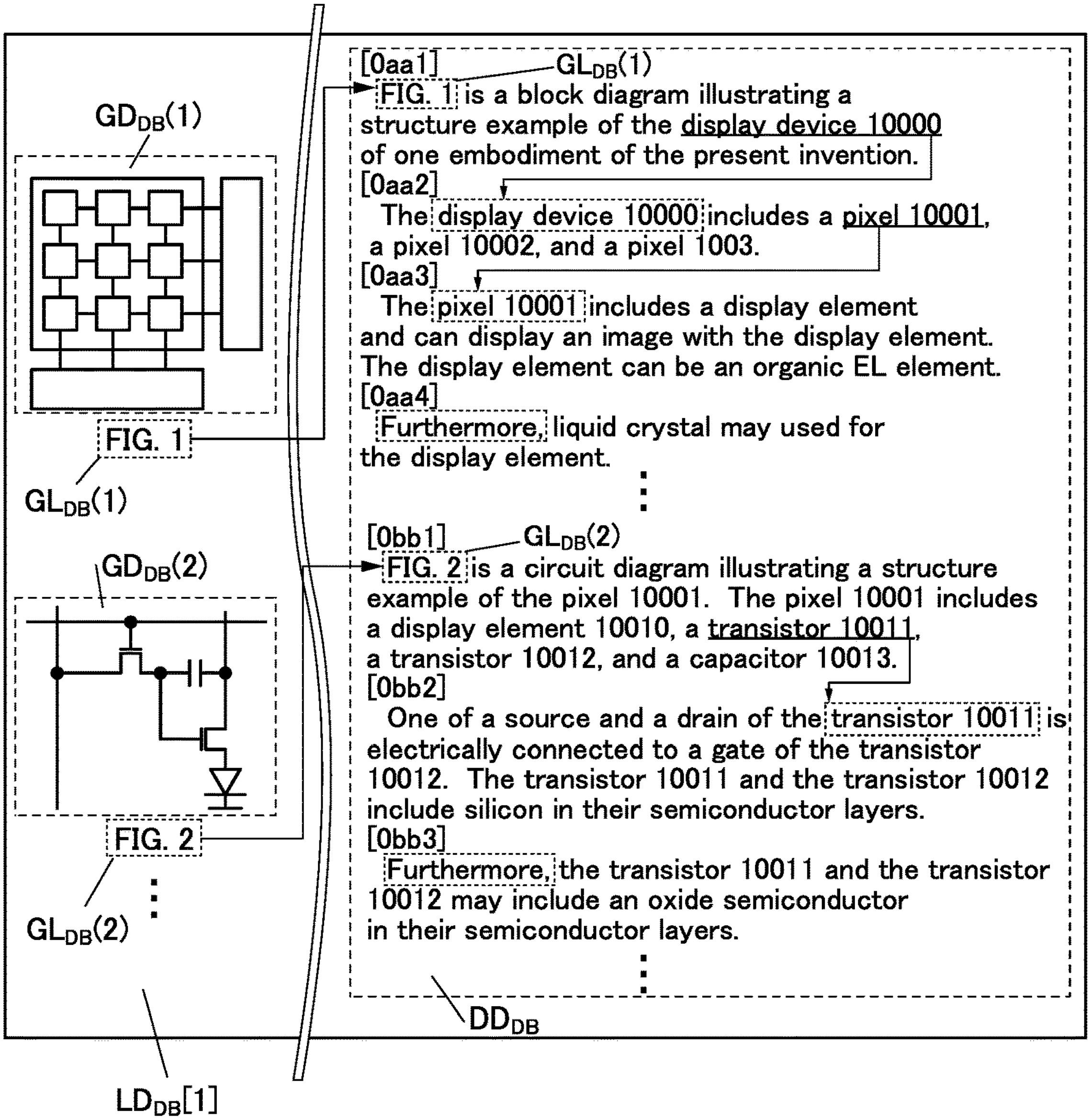
Figure 4A:
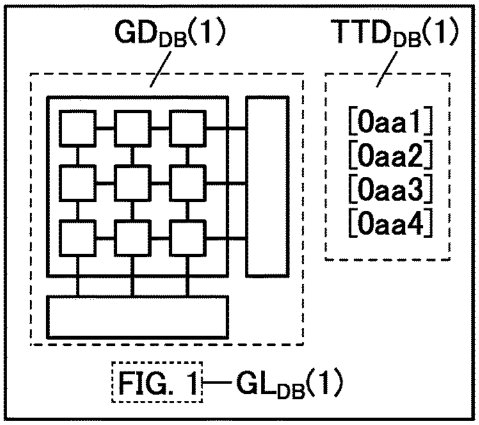
Figure 4A:
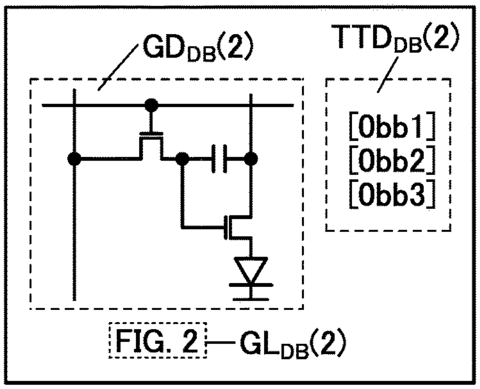

FIG. 4A is a schematic view illustrating an example a method for obtaining the tag-obtaining-purpose database text data $TTD_{DB}$, and FIGS. 4B1 and 4B2 are schematic views illustrating an example of the tag-obtaining-purpose database text data $TTD_{DB}$. In the example illustrated in FIGS. 4A, 4B1, and 4B2, the tag-obtaining-purpose database text data $TTD_{DB}$ is extracted for each of the database image data $GD_{DB}$(1) and the database image data $GD_{DB}$(2) included in the database literature data $LD_{DB}$[1].

The tag-obtaining-purpose database text data $TTD_{DB}$ can be extracted on the basis of the database image label $GL_{DB}$. For example, of the paragraphs included in the database document data $DD_{DB}$, a paragraph including the database image label $GL_{DB}$ can be at least partially included in the tag-obtaining-purpose database text data $TTD_{DB}$. For example, a paragraph including a sentence in which the database image label $GL_{DB}$ serves as the subject can be included in the tag-obtaining-purpose database text data $TTD_{DB}$. For example, a paragraph in which the opening sentence, i.e., the first sentence includes the database image label $GL_{DB}$ can be included in the tag-obtaining-purpose database text data $TTD_{DB}$. For example, a paragraph in which the first word is the database image label $GL_{DB}$ can be included in the tag-obtaining-purpose database text data $TTD_{DB}$.

In the example illustrated in FIG. 4A, "FIG. 1" serving as the database image label $GL_{DB}$(1) is the first word of a paragraph [0aa1]; therefore, the paragraph [0aa1] can be included in tag-obtaining-purpose database text data $TTD_{DB}$ (1). Furthermore, "FIG. 2" serving as the database image label $GL_{DB}$(2) is the first word of a paragraph [0bb1]; therefore, the paragraph [0bb1] can be included in the tag-obtaining-purpose database text data $TTD_{DB}$(2). Note that the tag-obtaining-purpose database text data $TTD_{DB}$ associated with the database image data $GD_{DB}$(1) is referred to as the tag-obtaining-purpose database text data $TTD_{DB}$ (1), and the tag-obtaining-purpose database text data $TTD_{DB}$ associated with the database image data $GD_{DB}$(2) is referred to as the tag-obtaining-purpose database text data $TTD_{DB}$ (2).

In this specification and the like, text extracted from the database document data $DD_{DB}$ on the basis of the database image label GLIB is referred to as a first database text in some cases.

The tag-obtaining-purpose database text data $TTD_{DB}$ may be extracted on the basis of a word with a reference numeral included in the first database text. For example, a paragraph including a word with a reference numeral included in the first database text may be at least partially included in the tag-obtaining-purpose database text data $TTD_{DB}$. For example, a paragraph including a sentence in which a word with a reference numeral included in the first database text serves as the subject may be included in the tag-obtaining-purpose database text data $TTD_{DB}$. For example, a paragraph in which the opening sentence, i.e., the first sentence includes a word with a reference numeral included in the first database text may be included in the tag-obtaining-purpose database text data $TTD_{DB}$. For example, a paragraph in which the first word is a word with a reference numeral included in the first database text may be included in the tag-obtaining-purpose database text data $TTD_{DB}$.

In the example illustrated in FIG. 4A, a word with a reference numeral, "display device 10000", is included in the paragraph [0aa1] that is the first database text associated with the database image data $GD_{DB}$(1). Furthermore, a word with a reference numeral, "transistor 10011", is included in the paragraph [0bb1] that is the first database text associated with the database image data $GD_{DB}$(2). Here, for example, "10000" is the reference numeral in the word "display 10000", and "10011" is the reference numeral in the word "transistor 10011". Note that a reference numeral may include an alphabet, a Greek character, a Japanese phonetic alphabet, or another character.

Reference numerals, which are normally described in the drawing, are omitted in the database image data $GD_{DB}$ illustrated in FIG. 4A for simplification of the drawing.

The same applies to other drawings showing image data mentioned in the following description.

The first word of a paragraph [0aa2] is the word with the reference numeral, "display device 10000", which is included in the first database text associated with the database image data $GD_{DB}$(1). Accordingly, the paragraph [0aa2] can be included in the tag-obtaining-purpose database text data $TTD_{DB}$(1). The first word of a paragraph [0bb2] is the word with the reference numeral, "transistor 10011", which is included in the first database text associated with the database image data $GD_{DB}$(2). Accordingly, the paragraph [0bb2] can be included in the tag-obtaining-purpose database text data $TTD_{DB}$(2).

In this specification and the like, text extracted from the database document data $DD_{DB}$ on the basis of a word with a reference numeral is referred to as a second database text in some cases.

The tag-obtaining-purpose database text data $TTD_{DB}$ may be extracted on the basis of a word with a reference numeral included in the second database text. For example, the tag-obtaining-purpose database text data $TTD_{DB}$ may be extracted on the basis of a word with a reference numeral included in the second database text by the same method as that for extracting the tag-obtaining-purpose database text data $TTD_{DB}$ on the basis of a word with a reference numeral included in the first database text.

In the example illustrated in FIG. 4A, a word with a reference numeral, "pixel 10001", is included in the paragraph [0aa2] that is the second database text associated with the database image data $GD_{DB}$(1). In addition, the first word of a paragraph [0aa3] is the word "pixel 10001". Therefore, the paragraph [0aa3] can be included in the tag-obtaining-purpose database text data $TTD_{DB}$(1), as the second database text associated with the database image data $GD_{DB}$(1).

For example, a paragraph in which the first word is a word with a reference numeral included in the first database text or the second database text and which is apart from the first database text by a predetermined number of paragraphs or more is not necessarily included in the second database text, for example. That is, for example, a paragraph that includes the word with the reference numeral included in the first database text or the second database text and is apart from the first database text by the number of paragraphs less than the predetermined number may be included in the second database text.

For example, the database image data $GD_{DB}$ associated with the database image label $GL_{DB}$ is not described sufficiently in some cases in a paragraph in which the first word is the word with the reference numeral included in the first database text or the second database text and which is farther away from the first database text extracted from the database document data $DD_{DB}$ on the basis of the database image label $GL_{DB}$. Accordingly, paragraphs that are apart from the first database text by the predetermined number of paragraphs or more are excluded from the tag-obtaining-purpose database text data $TTD_{DB}$, whereby the text in which the database image data $GD_{DB}$ is not described sufficiently can be prevented from being included in the tag-obtaining-purpose database text data $TTD_{DB}$. Therefore, the database image data $GD_{DB}$ whose feature such as a represented concept, technical contents, or a focal point is similar to that of the image data input to the search system 10 can be searched for at high accuracy in a step described later.

Note that the above-mentioned predetermined number of paragraphs can differ between the case of a paragraph including a word with a reference numeral included in the first database text and the case of a paragraph including a word with a reference numeral that is not included in the first database text but included in the second database text, for example. For example, the predetermined number of paragraphs in the case of a paragraph including a word with a reference numeral included in the first database text can be larger than the predetermined number of paragraphs in the case of a paragraph including a word with a reference numeral not included in the first database text but included in the second database text. For example, assume in the example in FIG. 4A that the predetermined number of paragraphs in the case of the paragraph including the word with the reference numeral included in the first database text is seven, and the predetermined number of paragraphs in the case of the paragraph including the word with the reference numeral that is not included in the first database text but included in the second database text is five. In this case, when the word with the reference numeral, "display device 10000", included in the paragraph [0aa1] that is the first database text is included, for example, in the subject of a sentence in a paragraph [0aa7] (not illustrated), the paragraph [0aa7] can be included in the tag-obtaining-purpose database text data $TTD_{DB}$(1), as the second database text. Meanwhile, for example, when the word with the reference numeral, "pixel 10001", which is not included in the paragraph [0aa1] but included in the paragraph [0aa2] (the second database text) is included in the subject of a sentence in the paragraph [0aa7] and the word "display device 10000" is not included in the subject of the sentence in the paragraph [0aa7], the paragraph [0aa7] can be excluded from the tag-obtaining-purpose database text data $TTD_{DB}$(1).

The predetermined number of paragraphs may vary depending on a method for extracting the second database text. For example, the first threshold value and the second threshold value larger than the first threshold value are set. Then, among paragraphs that are away from the paragraph including the first database text by the number of paragraphs less than the first threshold value, all the paragraphs that include the word with the reference numeral included in the first database text or the second database text can be included in the second database text. Then, among paragraphs that are away from the paragraph including the first database text by the number of paragraphs more than or equal to the first threshold value and less than the second threshold value, only a paragraph in which the first word is the word with the reference numeral included in the first database text or the second database text can be included in the second database text. Then, as for paragraphs that are away from the paragraph including the first database text by the number of paragraphs more than or equal to the second threshold value, even a paragraph in which the first word is the word with the reference numeral included in the first database text or the second database text can be excluded from the second database text.

The reference numeral used for extraction of the second database text can be extracted from the database image data $GD_{DB}$. For example, a reference numeral may be read from the database image data $GD_{DB}$ by the text extraction unit 21, and at least part of a paragraph including a word with the reference numeral may be included in the tag-obtaining-purpose database text data $TTD_{DB}$. For example, a paragraph including a sentence in which the word with the reference numeral serves as the subject may be included in the tag-obtaining-purpose database text data $TTD_{DB}$. For example, a paragraph in which the opening sentence, i.e., the first sentence includes the word with the reference numeral may be included in the tag-obtaining-purpose database text data $TTD_{DB}$. For example, a paragraph in which the first word is the word with the reference numeral may be included in the tag-obtaining-purpose database text data $TTD_{DB}$. Note that in the case where the reference numeral used for extraction of the second database text is extracted from the database image data $GD_{DB}$, the above-described extraction of the word with the reference numeral from the database document data $DD_{DB}$ is not necessarily performed.

Furthermore, for example, at least part of a paragraph including a predetermined word may be included in the tag-obtaining-purpose database text data $TTD_{DB}$. For example, a paragraph in which the first word is a conjunctive adverb for adding information, such as "Furthermore" and which is away from the first database text or the second database text by the predetermined number of paragraphs or less may be included in the tag-obtaining-purpose database text data $TTD_{DB}$.

In the example illustrated in FIG. 4A, the first word of a paragraph [0aa4] and the first word of a paragraph [0bb3] are each a conjunctive adverb for adding information, "Furthermore". The paragraph [0aa4] is close to the paragraphs [0aa1] to [0aa3] included in the tag-obtaining-purpose database text data $TTD_{DB}$(1) but is away from the paragraphs [0bb1] and [0bb2] included in the tag-obtaining-purpose database text data $TTD_{DB}$(2). Therefore, the paragraph [0aa4] can be included in the tag-obtaining-purpose database text data $TTD_{DB}$(1). The paragraph [0bb3] is close to the paragraphs [0bb1] to [0bb3] included in the tag-obtaining-purpose database text data $TTD_{DB}$(2) but is away from the paragraphs [0aa1] to [0aa3] included in the tag-obtaining-purpose database text data $TTD_{DB}$(1). Therefore, the paragraph [0bb3] can be included in the tag-obtaining-purpose database text data $TTD_{DB}$(2).

In this specification and the like, text extracted from the database document data $DD_{DB}$ on the basis of a word without a reference numeral, such as a conjunctive adverb for adding information, is referred to as third database text in some cases.

The tag-obtaining-purpose database text data $TTD_{DB}$ may or may not be extracted on the basis of a word with a reference numeral included in the third database text. In the case where the tag-obtaining-purpose database text data $TTD_{DB}$ is extracted on the basis of a word with a reference numeral included in the third database text, the extracted text can be included in the second database text, for example.

By the above-described method, the text extraction unit 21 can extract text describing the database image data $GD_{DB}$ from the database document data $DD_{DB}$ and obtain the tag-obtaining-purpose database text data $TTD_{DB}$. FIG. 4B1 is a schematic view illustrating an example of the tag-obtaining-purpose database text data $TTD_{DB}$(1) associated with the database image data $GD_{DB}$(1), and FIG. 4B2 is a schematic view illustrating an example of the tag-obtaining-purpose database text data $TTD_{DB}$(2) associated with the database image data $GD_{DB}$(2). As illustrated in FIG. 4B1, the paragraphs [0aa1] to [0aa4] can be the tag-obtaining-purpose database text data $TTD_{DB}$(1). Furthermore, as illustrated in FIG. 4B2, the paragraphs [0bb1] to [0bb3] can be the tag-obtaining-purpose database text data $TTD_{DB}$(2).

Note that the tag-obtaining-purpose database text data $TTD_{DB}$ is extracted for each paragraph in the illustrated example; however, one embodiment of the present invention is not limited thereto. For example, the tag-obtaining-purpose database text data $TTD_{DB}$ can be extracted for each sentence included in the database document data $DD_{DB}$. In this case, for example, when "paragraph" is replaced with "sentence" appropriately, the above-described method for extracting the tag-obtaining-purpose database text data $TTD_{DB}$ can be referred to.

After that, as shown in Step S03 in FIG. 2, the tag obtaining unit 23 obtains a database tag $TAG_{DB}$ on the basis of the tag-obtaining-purpose database text data $TTD_{DB}$. Specifically, the tag obtaining unit 23 obtains a database tag $TAG_{DB}$ that includes at least a part of words included in the tag-obtaining-purpose database text data $TTD_{DB}$. For example, the tag obtaining unit 23 can perform morphological analysis on the tag-obtaining-purpose database text data $TTD_{DB}$, and the divided words can be included in the database tag $TAG_{DB}$. For example, a word identified as a noun by morphological analysis can be included in the database tag $TAG_{DB}$. The tag-obtaining-purpose database text data $TTD_{DB}$ obtained by the tag obtaining unit 23 is assigned to the database image data $GD_{DB}$.

Figure 5A:
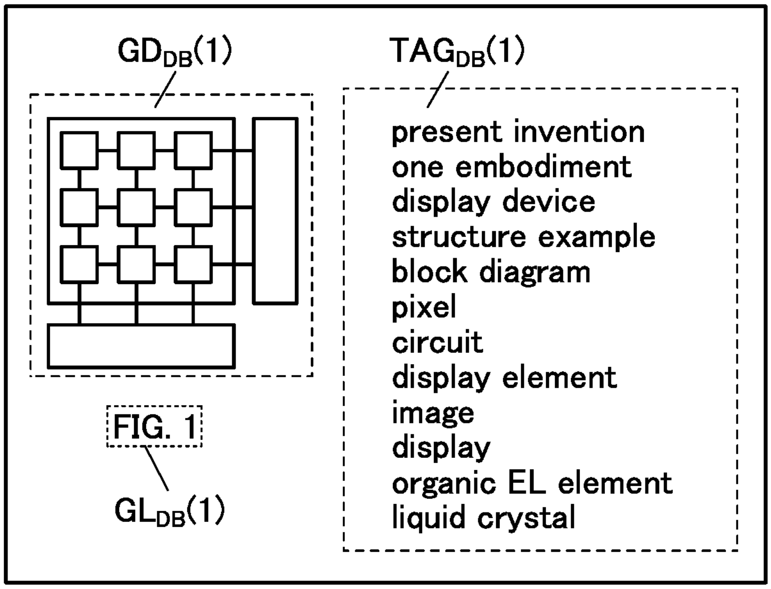
FIGS. 5A and 5B are schematic views each illustrating an example of a tag.
Figure 5B:
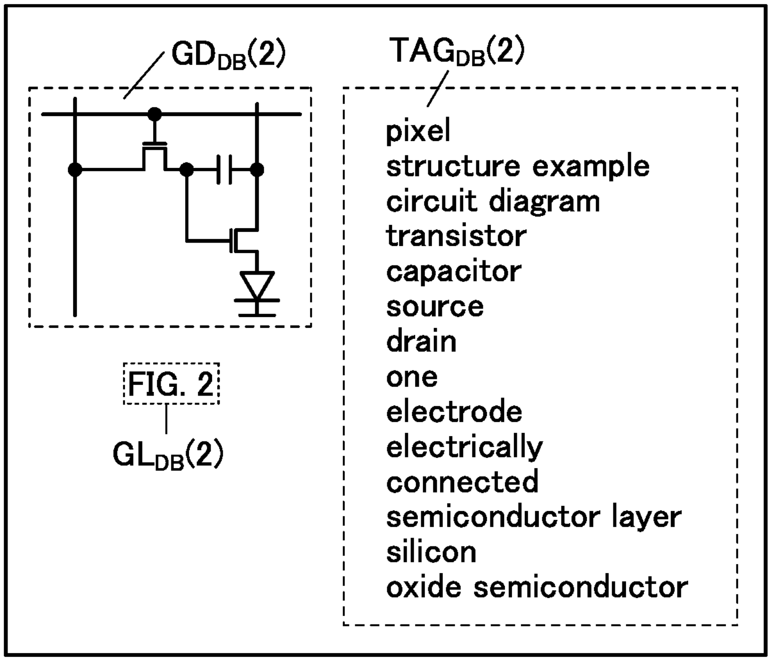

FIG. 5A is a schematic view illustrating an example of a database tag $TAG_{DB}$(1) assigned to the database image data $GD_{DB}$(1), and FIG. 5B is a schematic view illustrating an example of a database tag $TAG_{DB}$(2) assigned to the database image data $GD_{DB}$(2). As illustrated in FIG. 5A, nouns included in the paragraphs [0aa1] to [0aa4] can be the database tag $TAG_{DB}$(1). Furthermore, as illustrated in FIG. 5B, nouns included in the paragraphs [0bb1] to [0bb3] can be the database tag $TAG_{DB}$(2). Here, a reference numeral added to a word such as a noun can be excluded from in the database tag $TAG_{DB}$. For example, in the example illustrated in FIG. 5A, not "display device 10000" but "display device" is included in the database tag $TAG_{DB}$(1).

Note that all the words extracted by morphological analysis may be excluded from the database tag $TAG_{DB}$; for example, all the nouns extracted by morphological analysis may be excluded from the database tag $TAG_{DB}$. For example, extracted words with a high term frequency-inverse document frequency (TF-IDF) can be the database tag $TAG_{DB}$. For example, a word with a TF-IDF less than a predetermined value can be excluded from the database tag $TAG_{DB}$. Alternatively, among the words extracted by morphological analysis, a predetermined number of words, which are counted from one with the highest TF-IDF, can be the database tag $TAG_{DB}$.

A TF-IDF is calculated on the basis of two indices of a term frequency (TF) and an inverse document frequency (IDF). Thus, a word frequently appearing in the whole document has a high TF but has a low IDF. Accordingly, a word that frequently appears in the whole document has a lower TF-IDF than a word that frequently appears in text included in the tag-obtaining-purpose database text data $TTD_{DB}$ and does not frequently appear in another text. For example, a word that frequently appears in the whole database document data $DD_{DB}$ is not sometimes a word that concretely represents a feature represented by the database image data $GD_{DB}$, such as a concept, technical contents, or a focal point. Accordingly, when the database tag $TAG_{DB}$ is obtained in consideration of a TF-IDF, the database tag $TAG_{DB}$ more concretely represents the feature of the database image data $GD_{DB}$ than a database tag $TAG_{DB}$ that includes all the words extracted by morphological analysis. Therefore, in a step described later, the database image data $GD_{DB}$ whose feature such as a represented concept, technical contents, or a focal point is similar to that of the image data input to the search system 10 can be searched for highly accurately.

By the above-described method, the processing unit 20 can obtain the database tag $TAG_{DB}$. The database tag $TAG_{DB}$ can be assigned to the database image data $GD_{DB}$ and registered in the database 13.

[Search for Database Image Data]

Figure 6:
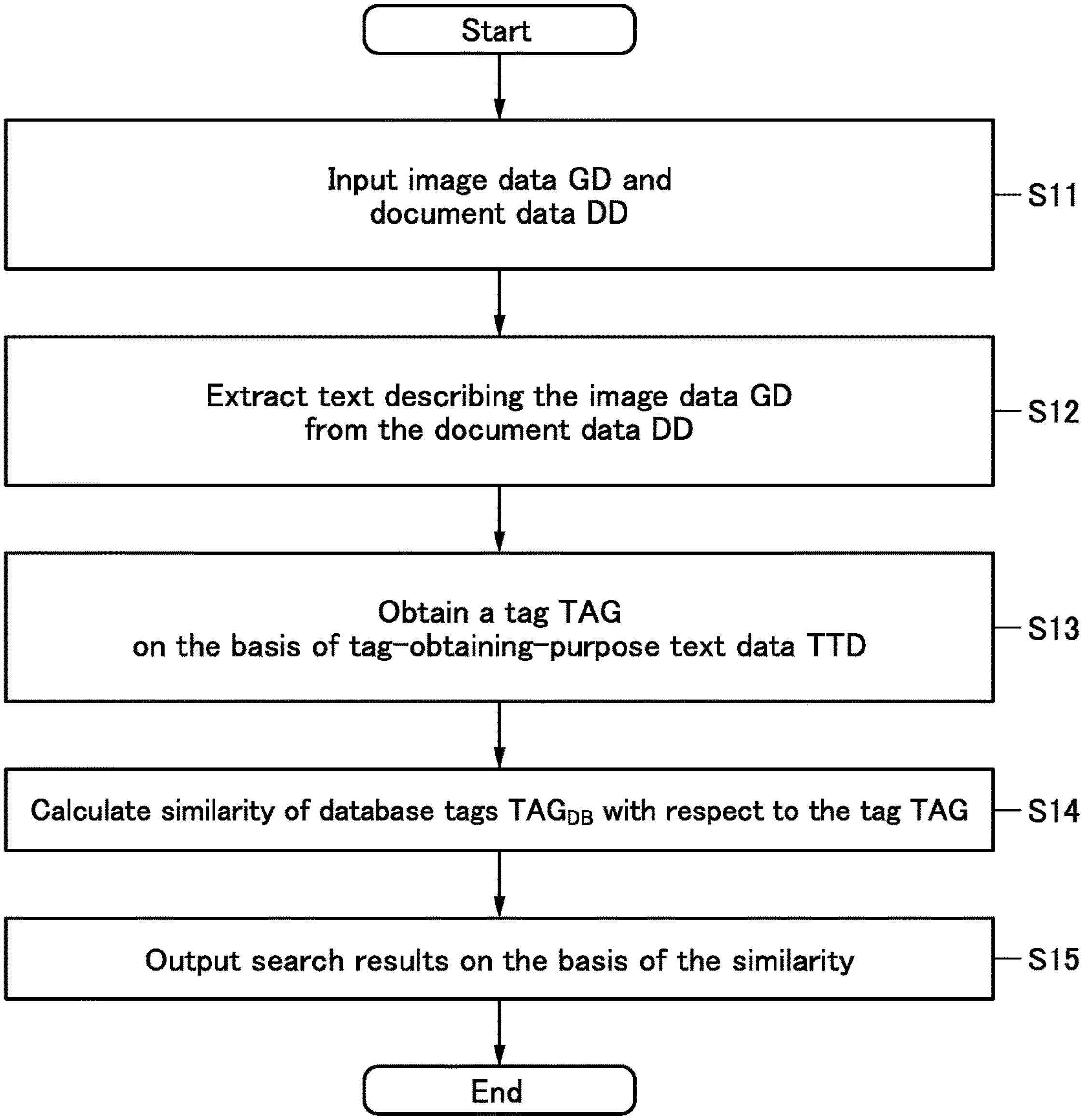
FIG. 6 is a flowchart showing an example of a search method.

FIG. 6 is a flow chart showing an example of a method for searching for database image data $GD_{DB}$. To search for database image data $GD_{DB}$, first, image data GD and document data DD are input as shown in Step S11. Specifically, literature data including image data GD to which an image label is assigned and document data DD is supplied to the input unit 11, for example. The literature data can be supplied to the input unit 11 from the outside of the search system 10, for example. Alternatively, literature data registered in the database 13 (database literature data) can be supplied to the input unit 11. In this case, desired literature data can be supplied to the input unit 11, for example, when the user of the search system 10 specifies information for identifying the database literature data. Although not illustrated, the literature data supplied to the input unit 11 in Step S11 is referred to as literature data LD. Furthermore, the image label assigned to the image data GD is referred to as an image label GL. The literature data LD can have the same structure as the database literature data $LD_{DB}$ illustrated in FIG. 3.

Next, text describing the image data GD is extracted from the document data DD as shown in Step S12 in FIG. 6. The extracted text is referred to as tag-obtaining-purpose text data TTD. The tag-obtaining-purpose text data TTD can be extracted by the same method as the method for extracting tag-obtaining-purpose database text data $TTD_{DB}$ illustrated in FIGS. 4A, 4B1, and 4B2.

In this specification and the like, text extracted from the document data DD on the basis of the image label GL is referred to as first text in some cases. Furthermore, text extracted from the document data DD on the basis of a word with a reference numeral is referred to as second text in some cases. Moreover, text extracted from the document data DD on the basis of a word without a reference numeral, such as a conjunctive adverb for adding information, is referred to as third text in some cases.

After that, the tag obtaining unit 23 obtains a tag TAG on the basis of the tag-obtaining-purpose text data TTD as shown in Step S13 in FIG. 6. Specifically, a tag TAG including at least a part of words included in the tag-obtaining-purpose text data TTD is obtained. The tag-obtaining-purpose text data TTD obtained by the tag obtaining unit 23 is assigned to the image data GD. The tag TAG can be obtained by the same method as the method for obtaining a database tag $TAG_{DB}$.

Next, as shown in Step S14 in FIG. 6, the tag similarity calculation unit 25 calculates similarity of the database tags $TAG_{DB}$ with respect to the tag TAG. For example, similarity with respect to the tag TAG can be calculated for all the database tags $TAG_{DB}$ registered in the database 13. Alternatively, similarity with respect to the tag TAG may be calculated for some of the database tags $TAG_{DB}$ registered in the database 13. For example, in the case where the database literature data $LD_{DB}$ and the literature data LD are each literature relating to an application, similarity with respect to the tag TAG can be calculated for only database tags $TAG_{DB}$ assigned to the database literature data $LD_{DB}$ corresponding to applications made before the application date of the literature data LD.

After that, as shown in Step S15 in FIG. 6, the output unit 15 outputs information as search results on the basis of the similarity. Specifically, the output unit 15 outputs information on the database image data $GD_{DB}$ to which the database tag $TAG_{DB}$ with high similarity is assigned. For example, the output unit 15 outputs the information to the outside of the search system 10.

For example, the output unit 15 can output database image data $GD_{DB}$ to which a database tag $TAG_{DB}$ with similarity higher than or equal to a predetermined value is assigned, and the database literature data $LD_{DB}$ including the database image data $GD_{DB}$. Alternatively, the output unit 15 can extract a predetermined number of database tags $TAG_{DB}$ counted from one with the highest similarity and output database image data $GD_{DB}$ to which the database tags $TAG_{DB}$ is assigned and database literature data $LD_{DB}$ including the database image data $GD_{DB}$. The information on the data output by the output unit 15 can be displayed by a display device provided outside the search system 10, for example. In the above manner, the information output by the output unit 15 can be presented to the user of the search system 10.

By the above method, the search system 10 can search for an image in which a feature value of the image itself is largely different but a feature such as a represented concept, technical contents, or a focal point is similar, from the database image data $GD_{DB}$. Furthermore, the search system 10 can search for a literature including the image from the database literature data $LD_{DB}$. Accordingly, the search system 10 can search for a patent document, a paper, or an industrial product that is related or similar to an invention before application can be retrieved, for example. Thus, prior art relating to the invention before filing can be searched for. Knowing and reviewing relevant prior art strengthens the invention, leading to a strong patent that other companies are highly likely to infringe.

For example, a patent document, a paper, or an industrial product that is related or similar to an industrial product before sale can be searched for with the use of the search system 10. For example, in the case where the database literature data $LD_{DB}$ includes one's own patent documents, the one can confirm whether patent applications are appropriately filed in association with technologies for the one's own industrial product before sale. Alternatively, when the database literature data $LD_{DB}$ includes information on intellectual properties of others, the one can confirm whether or not the one's own industrial product before sale infringes the others' intellectual property right. Knowing relevant prior art and reviewing technologies for the one's own industrial product before sale leads to discovery of a novel invention that is to be a strong patent contributing to one's own business. Search for an industrial product after sale may be conducted as well as search for an industrial product before sale.

Furthermore, for example, a patent document, a paper, or an industrial product that is related or similar to a specific patent can be searched for with the use of the search system 10. In particular, a search based on the filing date of the certain patent can reveal easily and accurately whether or not the patent includes grounds for invalidation.

In addition, by the above method, a tag TAG can be obtained so that the tag TAG can inclusively include words representing the concept, contents, focal point, and the like shown by the image data GD, as compared with the case where, for example, the user of the search system specifies all the words that are included in the tag TAG assigned to the image data GD and choices of words to be included in the tag TAG are not presented to the user. Thus, the image retrieval system 10 can perform retrieval in a short time.

<Method 1 with Machine Learning>

It is possible to obtain the tag-obtaining-purpose database text data $TTD_{DB}$ shown in Step S02 in FIG. 2 and the tag-obtaining-purpose text data TTD shown in Step S12 in FIG. 6 by using a machine learning model. As the machine learning model, for example, a multilayer perceptron, a neural network model, or the like can be employed. In particular, a neural network model is preferably used because processing such as learning and inference can be performed sufficiently.

Figure 7:
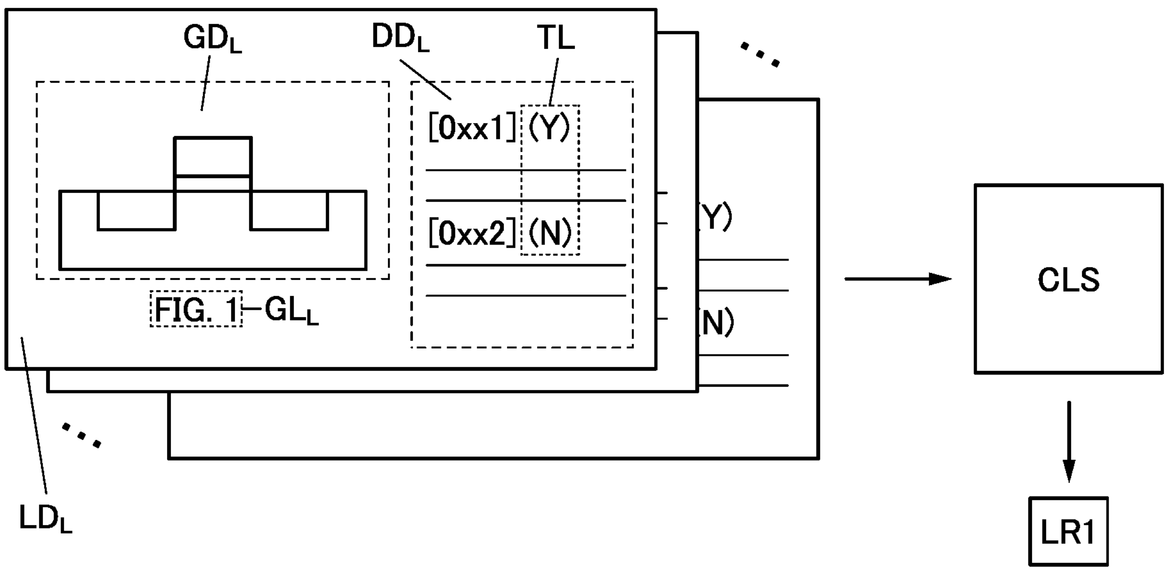
FIG. 7 is a schematic view illustrating an example of a learning method for a classifier.

FIG. 7 is a schematic view showing an example of a learning method of a classifier CLS, which is a machine learning model that can be used to obtain the tag-obtaining-purpose text data TTD. When a neural network model is applied to the classifier CLS, a convolutional neural network (CNN) model can be used, for example.

Learning of the classifier CLS can be made with supervised learning using a learning literature data $LD_L$. The learning literature data $LD_L$ includes learning image data $GD_L$ and learning document data $DD_L$. A learning image label $GL_L$ is assigned to the learning image data $GD_L$.

A label indicating whether or not the text describes the learning image data $GD_L$ is assigned to text included in the learning document data $DD_L$. Since the label indicate whether or not the text is used for obtaining a tag, the label is referred to as a tag label TL in this specification and the like. The tag label TL can be assigned to each paragraph or each sentence, for example. In FIG. 7, a tag label TL indicating that the text describes the learning image data $GD_L$ is denoted by "Y", and a tag label TL indicating that the text does not describe the learning image data $GD_L$ is denoted by "N".

The tag label TL can be assigned by the same method as the method illustrated in FIGS. 4A, 4B1, and 4B2. For example, a tag label TL denoted by "Y" is assigned to text that is extracted as tag-obtaining-purpose document data, and a tag label TL denoted by "N" is assigned to text that is not extracted as tag-obtaining-purpose document data. Alternatively, the tag label TL may be assigned manually. Further alternatively, the tag label TL may be assigned by the same method as the method illustrated in FIGS. 4A, 4B1, and 4B2, and then corrected manually.

The tag label TL can serve as a correct label in learning of the classifier CLS. Learning enables the classifier CLS to obtain a learning result LR1. The learning result LR1 can be, for example, a weight coefficient.

For example, at least part of the database literature data $LD_{DB}$ can be used as the learning literature data $LD_L$. Furthermore, literature data that is not registered in the database 13 may be used as the learning literature data $LD_L$. Here, it is preferable to use, as the learning literature data $LD_L$, a literature that is highly related to a literature that is assumed to be input as the literature data LD to the search system 10, in which case the classifier CLS can perform inference, which will be described later, with high accuracy.

For example, in the case where a literature used for the learning literature data $LD_L$ includes a plurality of images, e.g., a plurality of drawings, the learning literature data $LD_L$ can be divided for every images. For example, in the case where a literature used for the learning literature data $LD_L$ includes two images with image labels "FIG. 1" and "FIG. 2", the literature can be divided into learning literature data $LD_L$(1) including only the image with "FIG. 1" as learning image data $GD_L$ and learning literature data $LD_L$(2) including only the image with "FIG. 2" as learning image data $GD_L$.

Here, the learning document data $DD_L$ may be the same or different between pieces of learning literature data $LD_L$ that use different images extracted from the same literature, as their learning image data $GD_L$. For example, learning document data $DD_L$(1) included in the learning literature data $LD_L$(1) may be the same as or different from learning document data $DD_L$(2) included in the learning literature data $LD_L$(2). In the case where the learning document data $DD_L$ differs from each other, for example, text describing learning image data $GD_L$ and text in the vicinity thereof are preferably used as the learning document data $DD_L$, in which case learning of the classifier CLS is efficiently performed. For example, among paragraphs included in the literature from which learning image data $GD_L$(1) is extracted, a paragraph in which "FIG. 1" is described and neighboring paragraphs can be the learning document data $DD_L$(1). Furthermore, among paragraphs included in the literature from which learning image data $GD_L$(2) is extracted, a paragraph in which "FIG. 2" is described and neighboring paragraphs can be the learning document data $DD_L$(2).

Figure 8A:
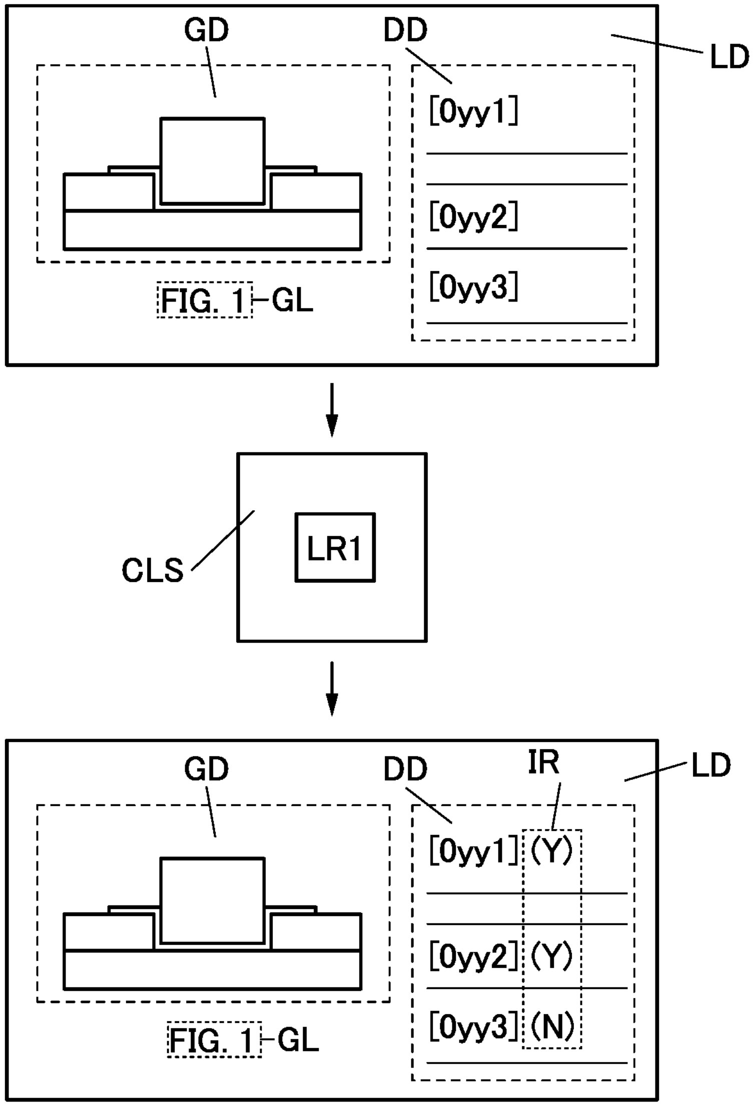
FIGS. 8A and 8B are schematic views illustrating an example of a method for obtaining tag-obtaining-purpose text data.
Figure 8B:
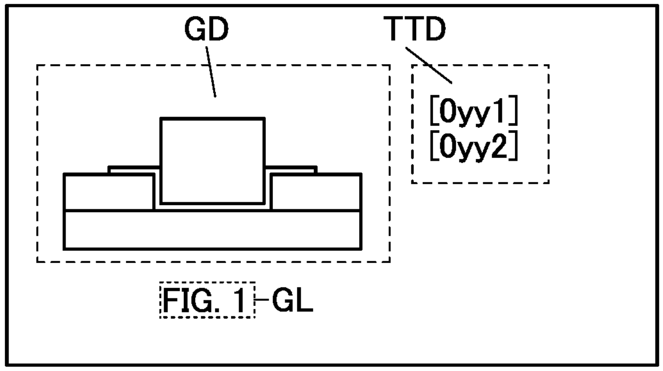

FIGS. 8A and 8B are schematic views illustrating an example of a method for obtaining the tag-obtaining-purpose text data TTD by performing inference with the learned classifier CLS. As illustrated in FIG. 8A, the literature data LD including the document data DD and the image data GD to which the image label GL is assigned is supplied to the classifier CLS, whereby an inference result IR is assigned to text included in the document data DD. Specifically, an inference result IR indicating whether or not the text describes the image data GD is assigned to text included in the document data DD.

For example, an inference result IR denoted by "Y" is assigned to text that is inferred to be text describing the image data GD, and an inference result IR denoted by "N" is assigned to text that is inferred to be not text describing the image data GD. Then, the text to which the inference result IR denoted by "Y" is assigned can be the tag-obtaining-purpose text data TTD. That is, Step S12 shown in FIG. 6 can be performed. In the example illustrated in FIG. 8A, the inference result IR denoted by "Y" is assigned to paragraphs [0yy1] and [0yy2] included in the document data DD, and the inference result IR denoted by "N" is assigned to a paragraph [0yy3]. In FIG. 8B, tag-obtaining-purpose text data TTD that is obtained on the basis of the inference results IR is shown. The tag-obtaining-purpose text data TTD includes the paragraphs [0yy1] and [0yy2] and does not include the paragraph [0yy3]. Here, the classifier CLS can be incorporated in the text extraction unit 21 because the tag-obtaining-purpose text data TTD is obtained by the text extraction unit 21.

Note that the tag-obtaining-purpose database text data $TTD_{DB}$ can be obtained by the same method as the method illustrated in FIGS. 8A and 8B when "literature data LD" is replaced with "database literature data $LD_{DB}$" and a word(s) is replaced as needed accordingly. Furthermore, also in the following description, the method illustrated in FIGS. 8A and 8B can be applied to the case of inference on the database literature data $LD_{DB}$ when a word(s) is replaced as needed appropriately.

After the tag-obtaining-purpose text data TTD is obtained, the tag TAG can be obtained by the same method as the method described with FIGS. 5A and 5B, for example. In other words, Step S13 shown in FIG. 6 can be performed. After that, the search system 10 can perform a search by performing processes of Steps S14 and S15 shown in FIG. 6.

In the method illustrated in FIGS. 8A and 8B, the tag-obtaining-purpose text data can be obtained in consideration of a feature value of the image itself represented by the image data GD. Here, in the learning of the classifier CLS illustrated in FIG. 7, in the case where the method illustrated in FIGS. 4A, 4B1, and 4B2 is not used in assigning the tag label TL, specifically, for example, in the case where the tag label TL is assigned manually, the learning image data $GD_L$ is not necessarily used for learning as long as the learning image label $GL_L$ is used for learning. In this case, also in the inference illustrated in FIG. 8A, the image data GD is not necessarily used for inference as long as the image label GL is used for inference.

<Method 2 with Machine Learning>

It is possible to obtain the database tag $TAG_{DB}$ shown in Step S03 in FIG. 2 and the tag TAG shown in Step S13 in FIG. 6 by using a machine learning model. As the machine learning model, for example, a multilayer perceptron, a neural network model, or the like can be employed. In particular, a neural network model is preferably used because processing such as learning and inference can be performed sufficiently.

Figure 9A:
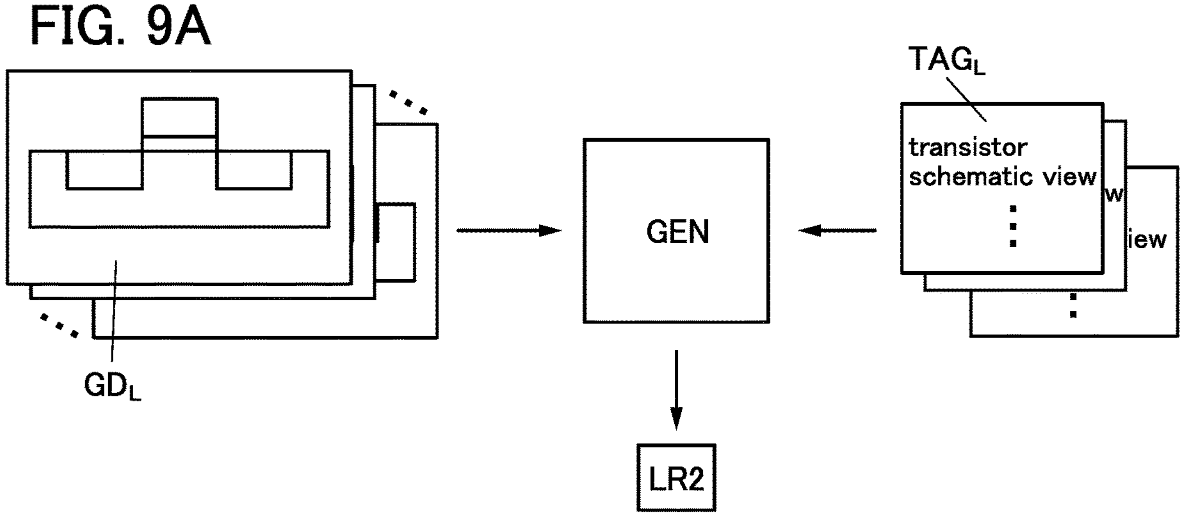
FIGS. 9A and 9B are schematic views illustrating an example of a method for obtaining a tag.

FIG. 9A is a schematic view showing an example of a learning method of a generator GEN, which is a machine learning model that can be used to obtain the tag TAG. When a neural network model is applied to the generator GEN, a model to which generative adversarial network (GAN) is applied, e.g., deep convolutional generative adversarial network (DCGAN), can be used, for example.

Learning of the generator GEN can be made with supervised learning in which a learning image data $GD_L$ is used and a learning tag $TAG_L$ serves as a correct label. The learning tag $TAG_L$ can be obtained by the same method as the method illustrated in FIGS. 4A, 4B1, 4B2, and FIGS. 5A and 5B. Alternatively, the learning tag $TAG_L$ may be assigned manually. Further alternatively, after the learning tag $TAG_L$ is assigned by the same method as the method illustrated in FIGS. 4A, 4B1, 4B2, and FIGS. 5A and 5B, words to be included in the learning tag $TAG_L$ may be added, erased, and corrected manually.

The above learning enables the generator GEN to obtain a learning result LR2. The learning result LR2 can be, for example, a weight coefficient.

Figure 9B:
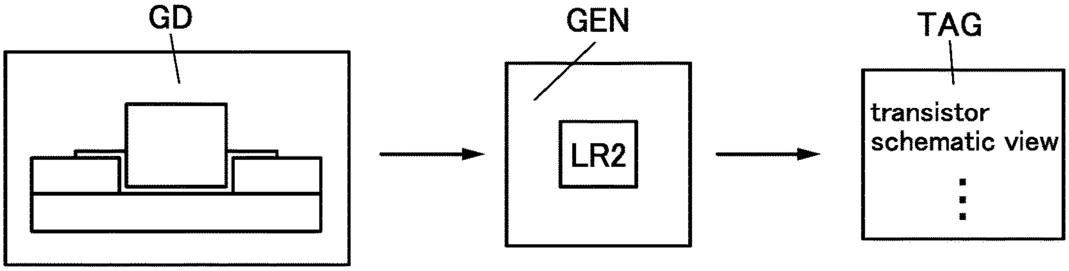

FIG. 9B is a schematic view illustrating an example of a method for obtaining the tag TAG by performing inference with the learned generator GEN. As illustrated in FIG. 9B, when the image data GD is supplied to the generator GEN, the tag TAG is generated as an inference result. For example, for each of possible words to be included in the tag, the generator GEN calculates probability that the word represents a feature of the image data GD, such as the concept, the technical contents, or the focal point, by inference, so that the words with the possibility higher than a predetermined value can be included in the tag TAG.

In the above manner, the tag TAG can be obtained. In other words, Step S13 shown in FIG. 6 can be performed. Here, since the tag TAG is obtained by the tag obtaining unit 23, the generator GEN can be incorporated in the tag obtaining unit 23. Note that in the case where the tag TAG is obtained with the use of the generator GEN, the tag-obtaining-purpose text data TTD is not necessarily obtained. Accordingly, Step S12 shown in FIG. 6 is not necessarily performed. Furthermore, in the case where the tag TAG is obtained with the use of the generator GEN, the document data DD and the image label GL are not necessarily input in Step S11 shown in FIG. 6.

After the tag TAG is obtained, for example, processes in Step S14 and Step S15 shown in FIG. 6 are performed, whereby the search system 10 can perform a search.

Note that also in the case of the database tag $TAG_{DB}$, when "image data GD" is replaced with "database image data $GD_{DB}$" and a word(s) is replaced as needed accordingly, whereby the database tag $TAG_{DB}$ can also be obtained by the same method as that shown in FIG. 9B.

<Search System_2>

Figure 10:
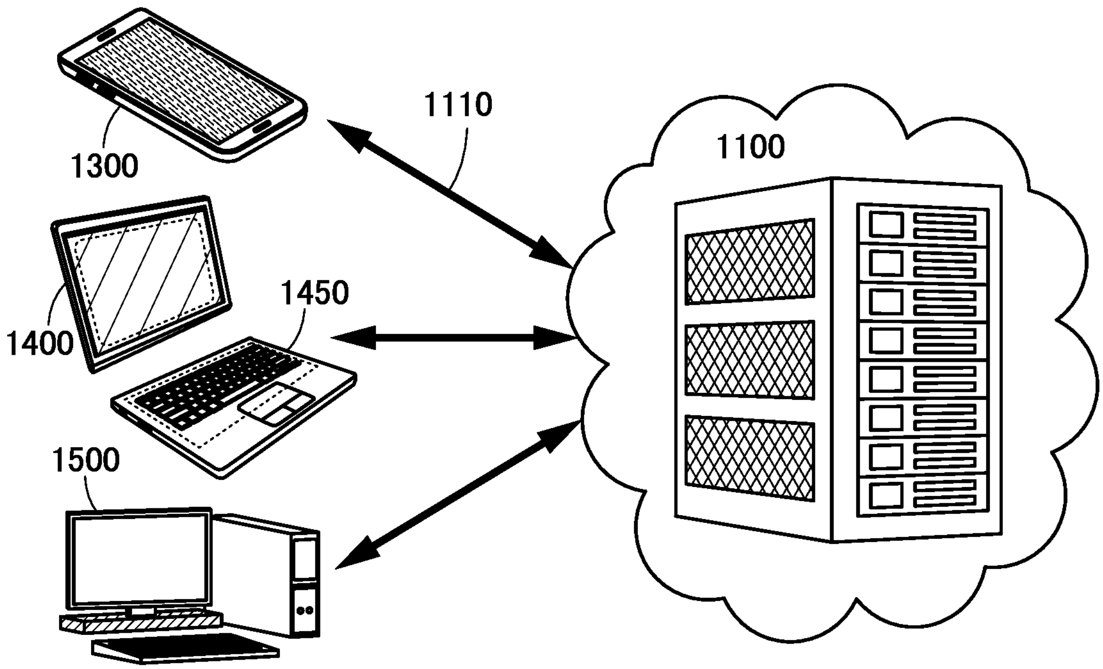
FIG. 10 illustrates an example of a search system.

FIG. 10 is a conceptual diagram of the search system of this embodiment.

The search system illustrated in FIG. 10 includes a server 1100 and terminals (also referred to as electronic devices). Communication between the server 1100 and each terminal is conducted via an Internet connection 1110.

The server 1100 is capable of performing arithmetic operation using data input from the terminal via the Internet connection 1110. The server 1100 is capable of transmitting an arithmetic operation result to the terminal via the Internet connection 1110. Accordingly, a burden of the arithmetic operation in the terminal can be reduced.

In FIG. 10, an information terminal 1300, an information terminal 1400, and an information terminal 1500 are illustrated as the terminals. The information terminal 1300 is an example of a portable information terminal such as a smartphone. The information terminal 1400 is an example of a tablet terminal. When the information terminal 1400 is connected to a housing 1450 with a keyboard, the information terminal 1400 can be used as a notebook information terminal. The information terminal 1500 is an example of a desktop information terminal.

With such constitution, a user can access the server 1100 from the information terminal 1300, the information terminal 1400, the information terminal 1500, and the like. Then, through the communication via the Internet connection 1110, the user can receive a service offered by the administrator of the server 1100. The service include a service with the use of the search system of one embodiment of the present invention, for example. In the service, an artificial intelligence may be utilized in the server 1100.

This application is based on Japanese Patent Application Serial No. 2021-151388 filed with Japan Patent Office on Sep. 16, 2021, the entire contents of which are hereby incorporated by reference.

What is claimed is:

1. A search system comprising:

a processor, the processor configured to:

receive a document data;

extract at least one text data from the received document data, the at least one text data including a first image label which is assigned to a first image data;

obtain a first tag from the at least one text data, the tag containing at least one word related to the first image label, wherein the first tag is obtained based on a reference numeral attached to the word;

calculate similarities between the first tag and a plurality of second tags stored in a database, wherein the plurality of second tags is associated with a plurality of second image data of a plurality of second document data, and wherein each of the plurality of second tags includes at least one word which relates to an image label assigned to one of the plurality of second image data; and identify at least one of the plurality of second image data based on the similarities.

2. The search system according to claim 1, wherein the at least one text data is extracted from the received document data a machine learning model on the basis of the image data and the document data, and wherein the machine learning model is learned using learning image data to which a learning image label is assigned and learning document data including the learning image label.

3. The search system according to claim 2, wherein a tag label indicating whether or not text is used for obtaining a tag is assigned to text represented by the learning document data.

4. The search system according to claim 3, wherein the tag label is assigned on the basis of the learning image label.

5. The search system according to claim 3, wherein the tag label is assigned to each paragraph included in the learning document data.

6. The search system according to claim 1, wherein the similarities are calculated using at least one of Jaccard index, Dice index and Simpson index.

7. The search system according to claim 1, wherein the calculation of the similarities use vectorized data of the words contained in the first tag and the plurality of the second tags.

8. The search system according to claim 1, wherein the reference numeral is at least one of an alphabet, a Greek character, a Japanese phonetic alphabet, and a number.

9. The search system according to claim 1, wherein the plurality of second document data is patent application documents.

10. The search system according to claim 1, wherein the first image label is a figure number.

11. A search method for finding a database image to which a database tag including a word is assigned, comprising:

extracting at least one text data from document data, the at least one text data including a first image label which is assigned to a first image data;

obtaining a first tag from the at least one text data, the tag containing at least one word related to the first image label, wherein the first tag is obtained based on a reference numeral attached to the word;

calculating similarities between the first tag and a plurality of second tags stored in a database, wherein the plurality of second tags is associated with a plurality of second image data of a plurality of second document data, and wherein each of the plurality of second tags includes at least one word which relates to an image label assigned to one of the plurality of second image data;

identifying at least one of the plurality of second image data based on the similarities; and displaying the at least one of the plurality of second image data.

12. The search method according to claim 11, wherein the at least one text data is extracted from the received document data with a machine learning model on the basis of the image label and the document data, and wherein the machine learning model is learned using a learning image label and learning document data including the learning image label.

13. The search method according to claim 12, wherein a tag label indicating whether or not text is used for obtaining a tag is assigned to text represented by the learning document data.

14. The search method according to claim 13, wherein the tag label is assigned on the basis of the learning image label.

15. The search method according to claim 13, wherein the tag label is assigned to each paragraph included in the learning document data.

16. The search method according to claim 11, wherein the similarities are calculated using at least one of Jaccard index, Dice index and Simpson index.

17. The search method according to claim 11, wherein the calculation of the similarities use vectorized data of the words contained in the first tag and the plurality of the second tags.

18. The search method according to claim 11, wherein the reference numeral is at least one of an alphabet, a Greek character, a Japanese phonetic alphabet, and a number.

19. The search method according to claim 11, wherein the plurality of second document data is patent application documents.

20. The search method according to claim 11, wherein the first image label is a figure number.

* * * * *